Patented Aug. 3, 1937

2,088,641

UNITED STATES PATENT OFFICE 2,088,641

INSECTICIDE

William McIlvaine Dickson, Woodside, Del., and Arthur H. Henninger, St. Albans, N. Y., assignors to General Chemical Company, New York, N. Y., a corporation of New York No Drawing. Application April 8, 1933, Serial No. 665,234

1 Claim. (Cl. 167—15)

The present invention relates to insecticides, and particularly to improvements in insecticidal sprays or dusts for the treatment of plants generally, fruits in particular, and soils. The invention is also directed to a method for controlling codling moth infestation.

Several insecticides, for example arsenicals such as Paris green, calcium arsenate, lead arsenate, zinc arsenite and ferric arsenate have been employed or their use suggested, either in powder form or in water suspension, for controlling insect pests. Although such substances have been more or less widely used, it is general knowledge in the art, that the efficiency of known insecticides is low, that in seasons in which insect pests are unusually active, and in which codling moth infestation particularly is usually heavy, the percentage of apples injured by codling moth especially may exceed 50%.

One of the objects of the invention resides in the provision of a method for effectively controlling codling moth infestation. The invention also aims to provide insecticides by which such control may be accomplished. Irrespective of any theory involved or advanced herein, one phase of the invention is directed to the provision of insecticides comprising chiefly toxic substances, for example, one or more of a number of arsenicals, with which are incorporated materials which, as now understood, have little or no insecticidal value but possess marked astringent properties. The insecticides of the invention preferably comprise a major portion of a toxic substance, such as an arsenical, and a smaller portion of astringent ingredient such as tannic acid or tannic acid containing material. We have furthermore discovered that codling moth infestation may be particularly well controlled by means of an insecticide including an arsenical, and tannic acid or tannic acid containing material.

Several different arsenicals such as the arsenates or arsenites of lead, zinc, calcium, copper, iron, magnesium, chromium and aluminum are suitable for use as the principal toxic ingredient of the improved insecticides. The observations and research upon which the invention is based indicate that vegetable extracts such as those containing tannic acid are astringents remarkably well adapted for admixture with toxic ingredients such as arsenicals to provide insecticides of increased effectiveness especially with reference to codling moth control.

Appreciably improved results may be obtained by the use of a composition containing as little as 50% arsenical, the balance consisting of tannic acid or tannic acid containing substances. However, in the embodiments of the invention more particularly contemplated, the preferred insecticidal products contain about 60% arsenical. On the other hand, the arsenical content may be as much as 85% or more by weight of the whole. Of the several arsenicals mentioned, lead arsenate is preferred. If desired, one or more arsenicals may be admixed with the astringent material.

Tannic acid may be utilized as such, or may be incorporated in the form of substances containing tannic acid. Generally speaking, it is preferred to include tannic acid in quantities so that the acid as such is present in the product to an extent not less than about 15% by weight. The tannic acid content may well be as high as 30% of the whole, although in accordance with the invention, insecticides containing about 20% tannic acid are preferred. Instead of tannic acid, other astringent materials, such as aloes, quassia, ferric sulfate, alum, aluminum sulfate, burnt alum, and sodium aluminum sulfate may be used.

As noted, the tannic acid may be introduced in the form of tannic acid containing substances. For example, one such material may be commercial dry chestnut extract containing about 60% tannic acid. Another suitable tannic acid containing material is a dried sulfite liquor, a waste product of the paper-making industry. This substance contains tannins, including tannic acid, and varying quantities of calcium and magnesium sulfonates. Ingredients of these substances other than tannic acid may contribute to the effectiveness of the products. In the more desirable embodiments of the invention relative to the insecticides per se, when employing materials such as chestnut extract, it is preferred to incorporate not less than about 30% by weight of such tannic acid containing substances.

In tests carried out in the field for the purpose of comparing the efficiency of preferred compositions of the invention with other well known insecticides, procurable in the market and containing lead arsenate as the major toxic ingredient, it was found that in the case of apples treated with a commercial lead arsenate insecticide, the percentage of stung and wormy apples, i. e. unmarketable fruit rendered so, largely by codling moth sting, was approximately 60%, and beneath beta naphthol bands placed around the tree trunks, an average of about 24 codling moth larvae were discovered. Under substantially identical conditions, in an instance where an insecticide containing about 75% lead arsenate and 25% tannic acid as such was employed, the percentage of stung and wormy apples was reduced to about 45%, and only two larvae were found under the beta naphthol bands. Again, where the insecticide made up according to the invention comprised about 58% lead arsenate, and about 42% of commercial dry chestnut extract containing about 60% tannic acid, the percentage of stung and wormy apples was reduced to about 40%, and no larvae were discovered. In still another instance, when the insecticide contained about 60% lead arsenate, and around 40% of the above noted waste sulfite liquor product having a tannin content of about 50%, the percentage of stung and wormy apples was reduced to about 35%, and only a single larva was found. It will be understood that the beta naphthol bands referred to are disposed one about each tree trunk, and catch larvae working their way down the trunk to the base of the tree and to the ground around in search of suitable places for cocoon spinning. It will be apparent, of course, that the absence of larvae indicates much more effective control than where larvae were found beneath the bands.

In another test carried out in the field during a different season and under different conditions, where a known insecticide, containing lead arsenate as the major toxic ingredient, was employed the percentage of stung and wormy apples was close to 50%. Under identical conditions, where an insecticide of the invention contained about 60% lead arsenate, and around 40% of the dried waste liquor product, the percentage of stung and wormy apples was reduced to about 8%.

The above comparison of wormy fruit indicates the increased efficiency of the products of the invention during the season in which the fruit was sprayed. The great reduction of larvae shows that in a succeeding season, infestation will be markedly reduced. The benefits resulting from the use of the insecticides of the invention are cumulative, since the small number of larvae found under the beta naphthol bands indicates a lesser degree of infestation in the succeeding year.

It will be seen from the above, that the incorporation of the astringent materials noted with the arsenical results in compositions much more satisfactory than known insecticides, and particularly more effective with respect to control of codling moth infestation.

Study of the feeding habits of the larvae of certain chewing insects, especially the codling moth, seems to present reasonable ground for the assumption that one possible reason for the ineffectiveness of prior insecticides, particularly arsenicals, may not be on account of a lack of toxicity of the insecticide, but because of the peculiar physical ability of the larvae to quickly eliminate the poison dose from the body through the short alimentary tract before the toxic properties of the insecticide have had time to act and prove fatal.

Based on present observations, it is believed there is reasonable basis for the presumption that the greatly improved results obtained by use of insecticides of the invention may be attributed to the astringent ingredients of the mixture which may act to paralyze the segment muscles of the larvae, thus preventing elimination of the toxic arsenical ingredient before it becomes effective, and counteracting the results of the known habit of the larvae of ejecting the first bite on the outer surface of the fruit (which carries the poison) before burrowing into the underlying tissue.

Irrespective of theory, however, the fact remains that by the addition of the astringent ingredient to the arsenical such as lead arsenate, insecticide products have been produced which have proved in the field to be much more effective for codling moth control than prior commercial insecticidal compositions. As is known in the art, codling moth infestation is destructive to pome fruits, such as apples, pears and quinces and also to English walnuts. The citrus fruits, and stone fruits, such as peaches, apricots, plums and cherries, are not subject to attack by codling moth. The present invention is primarily directed to treatment of pome fruits, such as apples, pears and quinces, and also walnuts, susceptible to codling moth infestation.

In making up the compositions constituting the invention, it is preferred to mix the ingredients in dry form, although it may be found desirable to incorporate the tannic acid or tannic acid containing substances at some step in the process of making the insecticide before the latter is obtained in dry form.

When the above compositions are to be employed as a spray, satisfactory suspensions may be made up by mixing about one to one and one-half pounds of insecticide with about 50 gallons of water. Application to the fruit under treatment is effected in the usual manner. Likewise when applying the composition by dusting, the usual procedure may be followed.

The improved insecticides may be applied in the field as sprays or dusts, either alone, or in combination with fungicides such as sulfur, Bordeaux mixture, or other copper fungicide such as colloidal copper, or with other insecticides such as nicotine, oil sprays, and in general, with stomach poisons and contact insecticides. If desired, relatively small amounts of agents having deflocculating properties, such as dextrine, may be incorporated in the improved products.

We claim:

The method of controlling codling moth infestation, which comprises treating plants infested with codling moth with an insecticide comprising a stomach poison and not less than 15% by weight of an astringent ingredient.

WILLIAM McILVAINE DICKSON.
ARTHUR H. HENNINGER.